US011726589B2

(12) United States Patent
Inoue et al.

(10) Patent No.: US 11,726,589 B2
(45) Date of Patent: Aug. 15, 2023

(54) ELECTRONIC DEVICE AND FEEDBACK PROVIDING METHOD

(71) Applicant: Sony Corporation, Tokyo (JP)

(72) Inventors: Yukito Inoue, Tokyo (JP); Hiromu Takizawa, Kawagawa (JP); Takehiro Hagiwara, Kanagawa (JP); Hidenori Karasawa, Kanagawa (JP); Takeo Inagaki, Tokyo (JP); Daisuke Ishii, Tokyo (JP)

(73) Assignee: SONY CORPORATION, Tokyo (JP)

( * ) Notice: Subject to any disclaimer, the term of this patent is extended or adjusted under 35 U.S.C. 154(b) by 201 days.

(21) Appl. No.: 17/194,345

(22) Filed: Mar. 8, 2021

(65) Prior Publication Data

US 2021/0191537 A1     Jun. 24, 2021

Related U.S. Application Data

(63) Continuation of application No. 15/516,694, filed as application No. PCT/JP2015/075138 on Sep. 3, 2015, now Pat. No. 10,996,776.

(30) Foreign Application Priority Data

Oct. 31, 2014   (JP) ................ 2014-222768

(51) Int. Cl.
*G06F 3/041*       (2006.01)
*G06F 3/048*       (2013.01)
(Continued)

(52) U.S. Cl.
CPC .............. *G06F 3/041* (2013.01); *G06F 1/206* (2013.01); *G06F 3/01* (2013.01); *G06F 3/016* (2013.01);
(Continued)

(58) Field of Classification Search
CPC ...... G06F 1/206; G06F 3/04817; G06F 3/023; G06F 3/04886; G06F 3/01; G06F 3/041;
(Continued)

(56) References Cited

U.S. PATENT DOCUMENTS

| 2002/0087555 A1 | 7/2002 | Murata |
| 2011/0106279 A1 | 5/2011 | Cho et al. |

(Continued)

FOREIGN PATENT DOCUMENTS

| JP | H10-187296 A | 7/1998 |
| JP | 2002-202786 A | 7/2002 |

(Continued)

OTHER PUBLICATIONS

International Search Report dated Oct. 6, 2015 in PCT/JP2015/075138 flied Sep. 3, 2015.

(Continued)

*Primary Examiner* — Yaron Cohen
(74) *Attorney, Agent, or Firm* — Xsensus LLP

(57) ABSTRACT

To intuitively identify the state of an electronic device.
There is provided an electronic device that implements a predetermined function, the electronic device including: an operation detection unit configured to detect a physical operation on the electronic device; a transmitter configured to transmit operation information indicating the operation to an external device; a receiver configured to receive feedback information indicating at least a type of feedback representing a state relating to the function, the feedback information being transmitted by the external device in response to the operation information; and a feedback unit configured to provide the feedback in accordance with the feedback information.

13 Claims, 10 Drawing Sheets

(51) Int. Cl.
*G06F 3/01* (2006.01)
*G06F 1/20* (2006.01)
*H01R 13/717* (2006.01)
*H04M 1/02* (2006.01)

(52) U.S. Cl.
CPC ........... *G06F 3/048* (2013.01); *H01R 13/717* (2013.01); *H01R 13/7175* (2013.01); *H04M 1/0266* (2013.01); *G06F 2203/04105* (2013.01); *H04M 2250/22* (2013.01)

(58) Field of Classification Search
CPC .......... G06F 3/0238; G06F 3/02; G06F 3/048; G06F 3/016; G06F 2203/04105; H01R 13/717; H01R 13/7175; H04M 1/0266; H04M 2250/22
See application file for complete search history.

(56) References Cited

U.S. PATENT DOCUMENTS

| | | | |
|---|---|---|---|
| 2012/0130513 A1 | 5/2012 | Hao et al. | |
| 2012/0206414 A1* | 8/2012 | Tada | G06F 3/0346 345/173 |
| 2013/0050513 A1* | 2/2013 | Hayashi | H04N 5/23206 348/E5.043 |
| 2014/0019882 A1 | 1/2014 | Chew et al. | |
| 2014/0198130 A1* | 7/2014 | Lacroix | G06F 3/016 345/633 |
| 2014/0218517 A1 | 8/2014 | Kim et al. | |
| 2014/0289644 A1 | 9/2014 | Clarke et al. | |

FOREIGN PATENT DOCUMENTS

| | | |
|---|---|---|
| JP | 2010-61493 A | 3/2010 |
| JP | 2011-10222 A | 1/2011 |
| JP | 2012-205251 A | 10/2012 |
| JP | 2014-32501 A | 2/2014 |
| JP | 2014-139784 A | 7/2014 |

OTHER PUBLICATIONS

Office Action dated Feb. 2, 2021 in Japanese Patent Application No. 2020-018839, 6 pages.
Bamboo, NE Report NE Reports, Nikkei Electronics No. 1138 Nikkei Electronics, Jul. 4, 2014, 3 pages.

* cited by examiner

ELECTRONIC DEVICE AND FEEDBACK PROVIDING METHOD

CROSS-REFERENCE TO RELATED APPLICATIONS

This application is a continuation of U.S. application Ser. No. 15/516,694, filed Apr. 4, 2017, which is a National Stage Application based on PCT/JP2015/075138, filed on Sep. 3, 2015, and claims priority to Japanese Patent Application No. 2014-222768, filed on Oct. 31, 2014, the entire contents of each are incorporated herein by its reference.

TECHNICAL FIELD

The present disclosure relates to an electronic device and a feedback providing method.

BACKGROUND ART

Techniques for operating a plurality of devices in cooperation with each other at home or other locations to fulfill their respective functions have been widespread. For example, Patent Literature 1 describes a technique for effectively supporting use of a function implemented by such cooperative operation between devices.

CITATION LIST

Patent Literature

Patent Literature 1: JP 2014-032501A

DISCLOSURE OF INVENTION

Technical Problem

The technique disclosed in Patent Literature 1 described above allows a setting operation including registration of a device in a system to be executed using a console displayed on the screen of a smartphone. In this case, information indicating a device to be operated is displayed only on the console, so the user sometimes has a difficulty in identifying, for example, information indicating how each device is recognized in the console.

Thus, the present disclosure provides a novel and improved electronic device and feedback providing method enabling intuitive identification of the state of an electronic device.

Solution to Problem

According to the present disclosure, there is provided an electronic device that implements a predetermined function, the electronic device including: an operation detection unit configured to detect a physical operation on the electronic device; a transmitter configured to transmit operation information indicating the operation to an external device; a receiver configured to receive feedback information indicating at least a type of feedback representing a state relating to the function, the feedback information being transmitted by the external device in response to the operation information; and a feedback unit configured to provide the feedback in accordance with the feedback information.

According to the present disclosure, there is provided a feedback providing method including, by an electronic device that implements a predetermined function: detecting a physical operation on the electronic device; transmitting operation information indicating the operation to an external device; receiving feedback information indicating at least a type of feedback representing a state regarding the function, the feedback information being transmitted by the external device in response to the operation information; and providing the feedback in accordance with the feedback information.

Advantageous Effects of Invention

The present disclosure described above allows the state of an electronic device to be identified intuitively.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
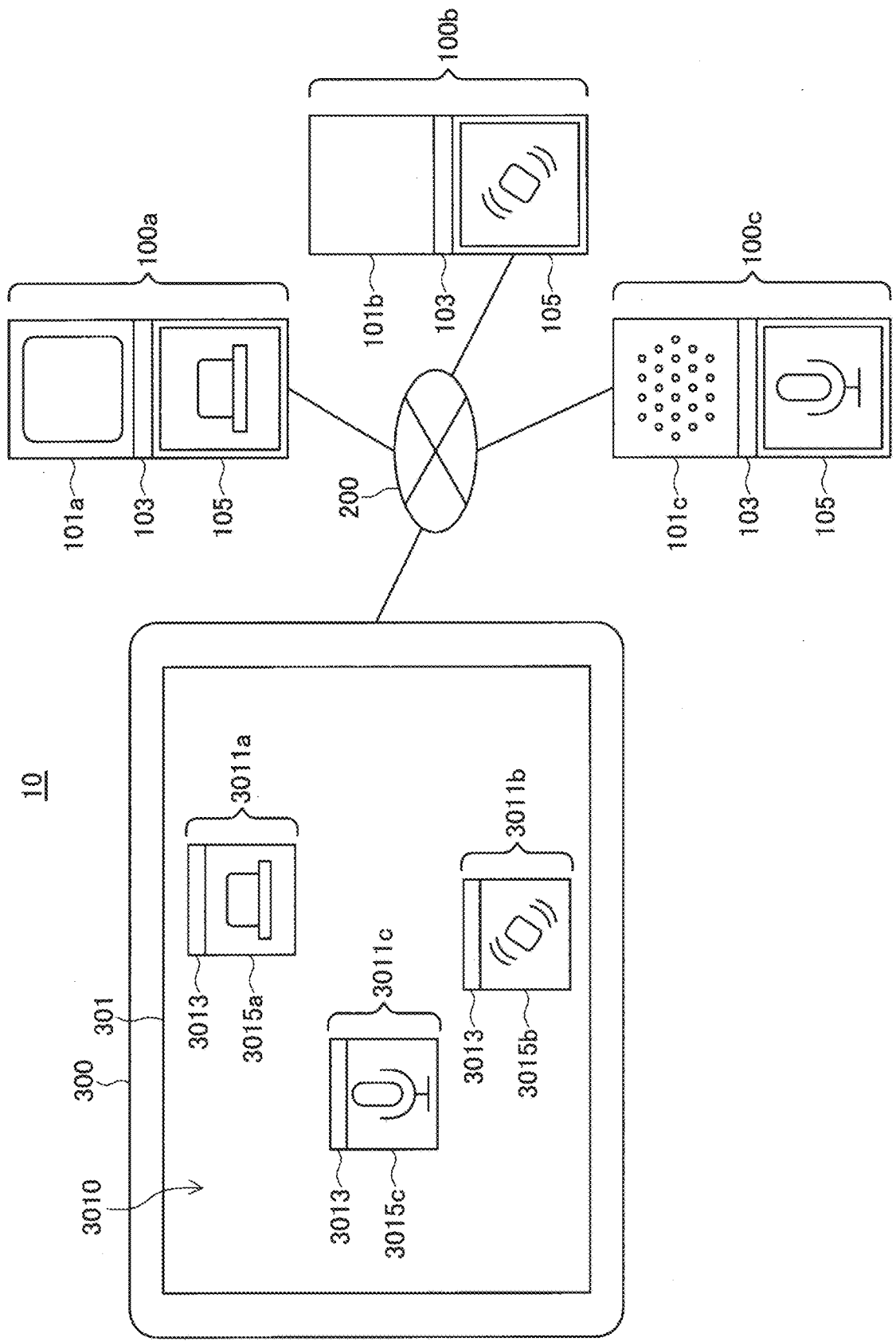
FIG. 1 is a schematic diagram illustrating the configuration of a system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will be given in the following order.
1. System Configuration
2. Interlocking Feedback during Operation on Console Screen 3. Interlocking Feedback during Operation on Electronic Device
4. Example of Setting Operation on Console Screen
5. Example of performing Operation on Electronic Device
6. Exemplary Functional Configuration of Electronic Device
7. Exemplary Functional Configuration of Control Device
8. Hardware Configuration
9. Supplement (1. System Configuration)

FIG. 1 is a schematic diagram illustrating the configuration of a system according to an embodiment of the present disclosure. Referring to FIG. 1, the system 10 includes an electronic device 100 and a control device 300. The electronic device 100 and the control device 300 communicate with each other via the network 200.

The electronic device 100 is configured to include a functional unit 101, an indicator 103, and an operation button 105. The electronic device 100 implements a predetermined function through the functional unit 101. In this illustrated example, a push button 100a, an acceleration sensor 100b, and a microphone 100c are illustrated as an example of the electronic device 100. The push button 100a, the acceleration sensor 100b, and the microphone 100c have different functional units 101a, 101b, and 101c, respectively. The indicator 103 serves as a feedback unit that provides feedback to the user using light emission. The operation button 105 serves as an operation detection unit that detects a physical operation, that is, a button depression operation in this example, on the electronic device 100 by the user. The indicator 103 and the operation button 105 may be components that are all included in each of the push button 100a, the acceleration sensor 100b, and the microphone 100c. The operation button 105 may have an icon that indicates a function of each electronic device 100, and this icon may be printed or engraved on the operation button 105 in external appearance as an example illustrated in the figure.

An example of the network 200 may include a wireless communication network such as Bluetooth (registered trademark) or Wi-Fi. For example, the electronic device 100 and the control device 300 may directly communicate with each other over the wireless communication network as described above. Alternatively, the electronic device 100 and the control device 300 may indirectly communicate with each other via a router or the like. In this case, the network 200 may include the Internet, a mobile network, and an external server.

The control device 300 has a display 301. The display 301 displays a console screen 3010. The console screen 3010 includes an icon 3011 indicating each of the electronic devices 100. In the illustrated example, the icon 3011 includes an indicator portion 3013 and an operation button portion 3015. Furthermore, in the illustrated example, the icon 3011 includes an icon 3011a corresponding to the push button 100a, an icon 3011b corresponding to the acceleration sensor 100b, and an icon 3011c corresponding to the microphone 100c. The icons 3011a, 3011b, and 3011c respectively include operation button portions 3015a, 3005b, and 3005c, on each of which a symbol for indicating a function of the corresponding electronic devices 100 is displayed. The display 301 having a touch screen formed thereon allows the user to perform an operation on each of the electronic devices 100 by operating the icon 3011 displayed on the display 301.

More specifically, the control device 300 may be a portable information processing terminal such as a tablet or a smartphone. Alternatively, the control device 300 may be a stationary information processing terminal such as a personal computer or a television set. In an example to be described later, the user can perform a setting operation or the like relating to the cooperative operation between the electronic devices 100 using the console screen 3010 displayed on the control device 300.

The system 10 in the illustrated example uses the electronic devices 100 as elements for implementing their respective functions, combines these elements, and operates them in cooperation with each other to allow an operation or a function intended by the user to be performed. In the control device 300, the operation on the icon 3011 corresponding to each of the electronic devices 100 allows the cooperative operation between the electronic devices (elements) 100 to be set up or the setting thereof to be changed. In the system 10 as described above, an example of the electronic device 100 is not limited to the illustrated push button, acceleration sensor, and microphone, but may include an element for implementing various functions. For example, the electronic device 100 may implement a function of a camera, a human presence detector, a loudspeaker, a light emitting diode (LED) lamp, or the like.

Moreover, although the plurality of electronic devices 100 are designed in a similar shape and they have the respective functions (push button, acceleration sensor, and microphone) in the illustrated example, the embodiments of the present disclosure are not limited to such examples. For example, the electronic devices 100 may be designed to have different shapes or may have a plurality of functions. In a case where the electronic device 100 has a plurality of functions, one of the functions may be usable for cooperation between devices in the system 10, and a function usable for cooperation between devices may be selectable.

More specifically, for example, a system according to another embodiment of the present disclosure may be configured to cause independently operable electronic devices, for example, consumer electronics (CEs) to be operated in cooperation with each other. In this case, each of the electronic devices is configured to include a functional unit, a feedback unit, and an operation detection unit, which is similar to the electronic device 100 in the system 10 described above. The feedback unit and the operation detection unit, as well as the function unit, may have different configurations for each of the electronic devices. In other words, the feedback unit is not limited to the configuration that provides feedback using light emission, like the indicator 103, but may be implemented as a display that provides feedback by displaying an image, a loudspeaker that provides feedback by voice, or a vibrator that provides feedback by vibration. Furthermore, the operation detection unit is not limited to the configuration that detects a depression operation of a button including the operation button 105, and may be implemented as a device that detects various other operations, such as a slide switch or a touch screen.

(2. Interlocking Feedback During Operation on Console Screen)

Figure 2:
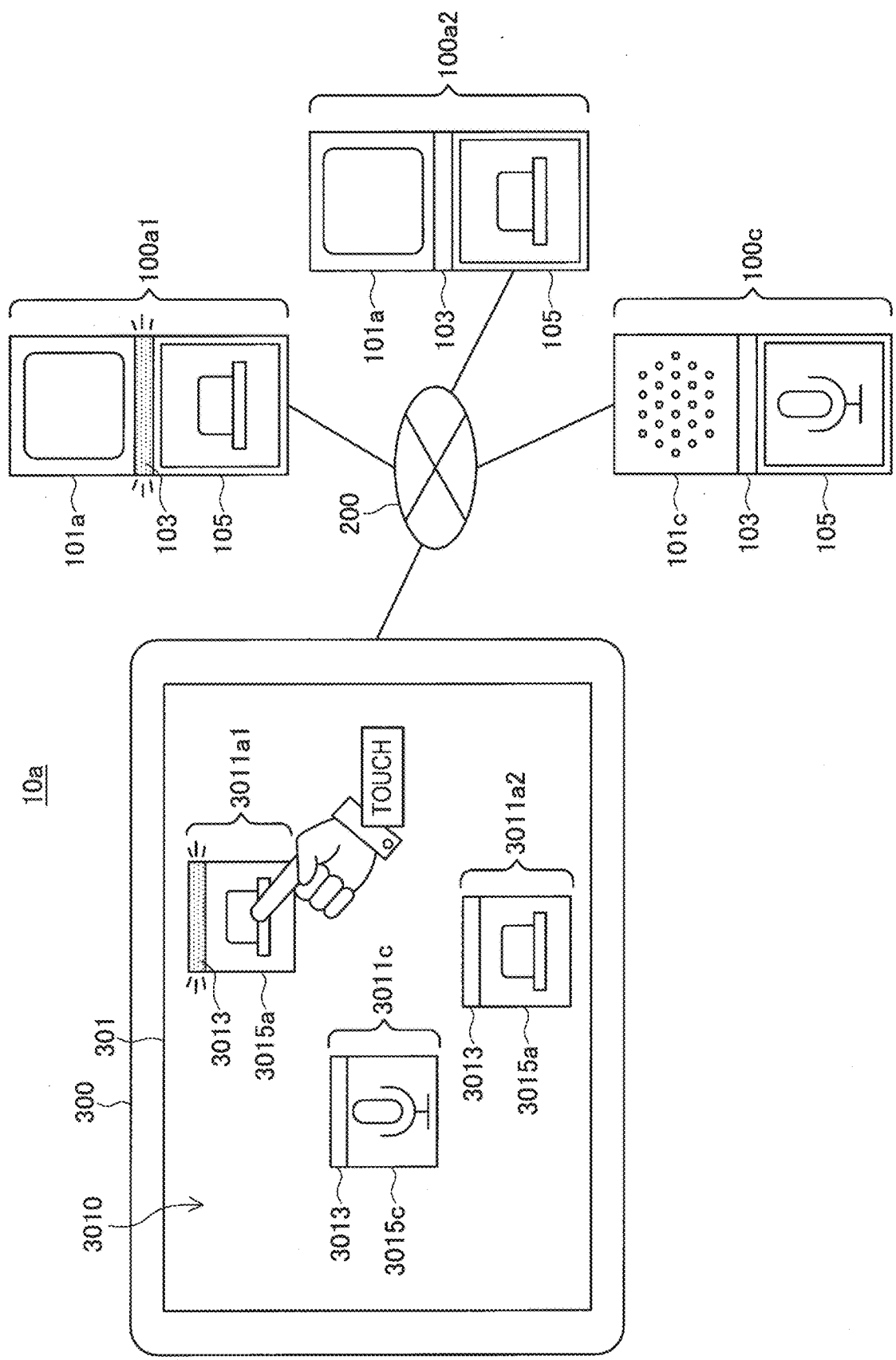
FIG. 2 is a diagram illustrated to describe interlocking feedback during operation on a console screen in an embodiment of the present disclosure.

FIG. 2 is a diagram illustrated to describe interlocking feedback during operation on a console screen in an embodiment of the present disclosure. In the example illustrated in FIG. 2, the electronic device 100 includes two push buttons 100a1 and 100a2 and a microphone 100c in a system 10a similar to that described above with reference to FIG. 1. Accordingly, also in a control device 300, a console screen 3010 includes icons 3011a1 and 3011a2 respectively corresponding to the push buttons 100a1 and 100a2 and an icon 3011c corresponding to the microphone 100c.

In this illustrated example, the user touches the icon 3011a1 displayed on the display 301. The control device 300 causes an indicator portion 3013 included in the icon 3011a1 to emit light in response to the operation by the user. Furthermore, the control device 300 transmits a feedback instruction to the push button 100a1 serving as the electronic device 100 corresponding to the icon 3011a1, and then the push button 100a1 that has received this instruction causes the indicator 103 to emit light.

As described above, the system 10a includes the two push buttons 100a1 and 100a2. In the illustrated example, these two electronic devices have a similar appearance and the icons 3011a1 and 3011a2 displayed in association with these two electronic devices have a similar appearance, so they are difficult to distinguish from each other as they are. While, the present embodiment causes the indicator portion 3013, which is included in the icon 3011a1 displayed on the console screen 3010 and selected by the user's touch operation, and the indicator 103, which is included in the push button 100a1 corresponding to the icon 3011a, to emit light having a color or pattern in common with each other, so that the user can recognize easily what device is selected. In other words, in the illustrated example, the type of feedback provided by the indicator 103 of the push button 100a1 corresponds to the type of feedback provided in the control device 300. This allows, for example, an operation (e.g., a setting operation) for causing the push button 100a1 to function in cooperation with another electronic device 100 to be performed intuitively.

Although, in the above example, the push button 100a1 and the control device 300 provide feedback indicating a recognition state (being recognized as the icon 3011a1) of the push button 100a1 in the control device 300, feedback indicating other states relating to the push button 100a1 may be provided.

For example, feedback indicating a state of cooperation of the push button 100a1 with another electronic device 100 in the cooperative operation between the plurality of electronic devices 100 managed by the control device 300 may be provided. For example, in the illustrated example, there is a case where the control device 300 recognizes each of the push button 100a1 and the microphone 100c and further sets the cooperative operation between the push button 100a1 and the microphone 100c. In this case, selection of the icon 3011a1 causes the indicator portion 3013 of the icon 3011c corresponding to the microphone 100c and the indicator 103 of the microphone 100c, in addition to the indicator portion 3013 of the icon 3011a1 and the indicator 103 of the push button 100a1, to emit light having a color or pattern in common or corresponding color or pattern.

Furthermore, for example, feedback indicating a state including a communication condition between the control device 300 and the electronic device 100 or a remaining battery level of the electronic device 100 may be provided. For example, in a case where the icon 3011a1 is selected in the illustrated example, the color and/or pattern of light emitted from the indicator portion 3013 of the icon 3011a1 and the indicator 103 of the push button 100a1 may be changed in accordance with a state including the communication condition between the control device 300 and the electronic device 100 or the remaining battery level of the electronic device 100. More specifically, for example, the color of light emitted from the indicator portion 3013 and the indicator 103 may be changed to green for the satisfactory communication condition, to orange for the moderately satisfactory communication condition, and to red for the unsatisfactory communication condition. This may be similarly applied to the remaining battery level, that is, the color of emitted light may be changed to green for the sufficient state, to orange for the slight deficient state, and to red for the deficient state. Furthermore, the pattern of emitted light allows a state including the communication condition or the remaining battery level to be represented, for example, by changing the frequency of blinking.

Figure 3:
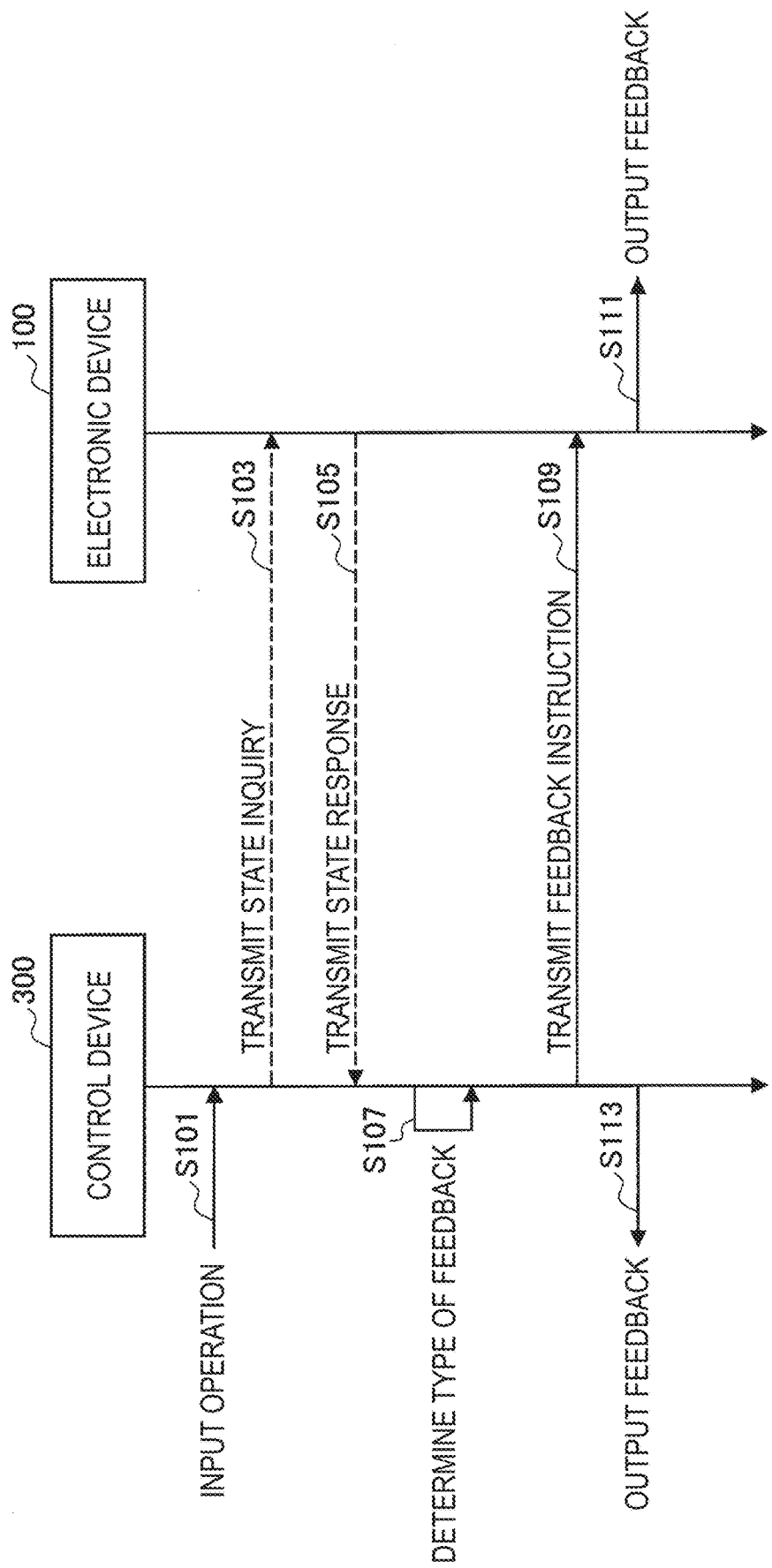
FIG. 3 is a sequence diagram illustrating an example of processing for interlocking feedback during operation on a console screen in an embodiment of the present disclosure.

FIG. 3 is a sequence diagram illustrating an example of processing for interlocking feedback during operation on the console screen in an embodiment of the present disclosure. Referring to FIG. 3, the control device 300 detects an operation input (a touch operation in the above example) on the icon 3011 displayed on the console screen 3010 (S101). In this case, the control device 300 transmits a state inquiry to the electronic device 100 (S103) as necessary, and the electronic device 100 transmits a state response to the control device 300 in response to the inquiry (S105). More specifically, for example, the remaining battery level of the electronic device 100 and the strength of radio waves for communication received by the electronic device 100 (radio waves received from the control device 300, a router, or the like) are notified to the control device 300 by the response of the electronic device 100.

Next, the control device 300 determines the type of feedback to be provided (S107). For example, the control device 300 determines a color and/or pattern of light to be emitted from the indicator portion 3013 displayed on the console screen 3010 and the indicator 103 of the electronic device 100 so that the colors and/or patterns are in common. In this case, the state of the electronic device 100 notified by the response from the electronic device 100 in S103 and S105 and the state of the electronic device 100 recognized independently by the control device 300, more specifically, the state of cooperation, the state of communication, the remaining battery level, and the like may be incorporated in the type of the feedback.

Furthermore, also in a case where simply the association between the electronic device 100 and the icon 3011 is represented, the control device 300 may change the type of feedback each time. For example, in the example illustrated in FIG. 2, in the case where the icon 3011a1 is selected and then the icon 3011a2 is selected, the control device 300 may cause the color and/or pattern to be emitted from the indicator portion 3013 of the icon 3011a1 and the indicator 103 of the push button 100a1 to be different from the color and/or pattern to be emitted from the indicator portion 3013 of the icon 3011a2 and the indicator 103 of the push button 100a2. This makes it possible for the user to identify easily what electronic device 100 corresponds to each of the plurality of icons 3011, for example, in a case where the user sequentially selects the icons 3011 on the console screen 3010.

Next, the control device 300 transmits a feedback instruction to the electronic device 100 (S109). The feedback instruction includes information indicating the type of feedback determined in S107. The electronic device 100 outputs feedback based on the feedback instruction received from the control device 300 (S111). In the example of FIG. 2, the electronic device 100 outputs the feedback by causing the indicator 103 to emit light. In addition, at the same time, the control device 300 also outputs the feedback (S113). In the example of FIG. 2, the control device 300 outputs the feedback by causing the indicator portion 3013 of the icon 3011 to emit light through the console screen 3010.

(3. Interlocking Feedback During Operation on Electronic Device)

Figure 4:
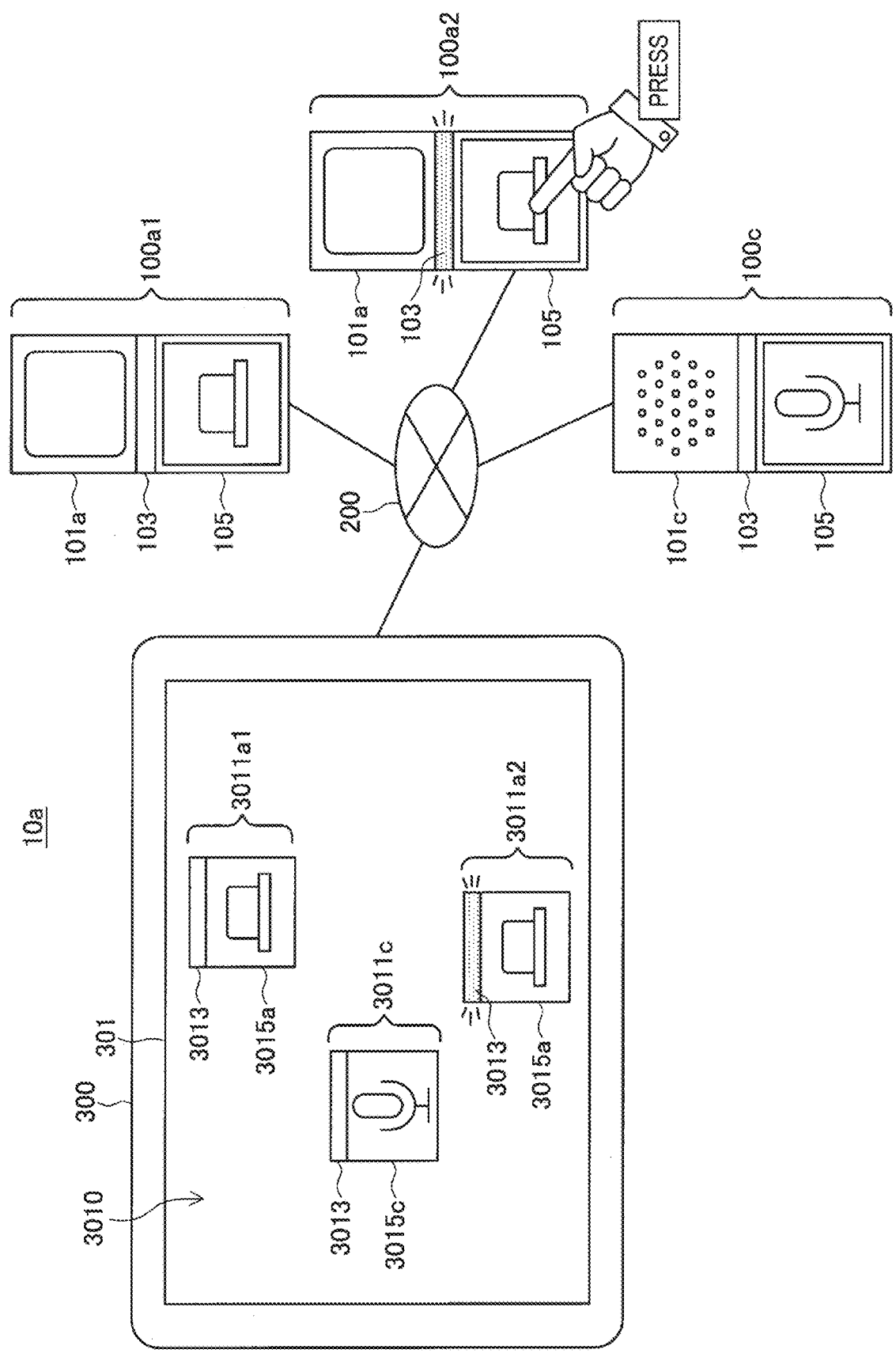
FIG. 4 is a diagram illustrated to describe interlocking feedback during operation on an electronic device in an embodiment of the present disclosure.

FIG. 4 is a diagram illustrated to describe interlocking feedback during operation on the electronic device in one embodiment of the present disclosure. In the example illustrated in FIG. 4, in a system 10a that is similar to that described above with reference to FIG. 3, the user presses down the operation button 105 of the push button 100a2. The push button 100a2 causes the indicator 103 to emit light in response to this operation. Furthermore, the push button 100a2 notifies the control device 300 that the operation has been performed, and the control device 300 causes the indicator portion 3013 of the icon 3011a2 corresponding to the push button 100a2 to emit light. In this case, the indicator 103 of the push button 100a2 and the indicator portion 3013 of the icon 3011a2 emit light having, for example, a color and/or pattern in common. In the illustrated example, the control device 300 determines the color and/or pattern of light to be emitted.

As described above, the system 10a includes the two push buttons 100a1 and 100a2. In the illustrated example, these two electronic devices have a similar appearance, and the icons 3011a1 and 3011a2 displayed in association with them also have a similar appearance, so they are difficult to distinguish from each other as they are. Thus, in the present embodiment, the indicator 103 of the push button 100a2 that is subject to the depression operation of the operation button 105 by the user and the indicator portion 3013 of the icon 3011a2 corresponding to the push button 100a2 are caused to emit light having a color or pattern in common. Thus, it is possible for the user identify easily how the device operated by the user is recognized in the control device 300. This allows, for example, the operation for causing the push button 100a2 to function in cooperation with another electronic device 100 later (e.g., a setting operation) to be intuitive performed.

Similar to the interlocking feedback during operation on the console screen as described above, with respect to the interlocking feedback during operation on the electronic device illustrated in FIG. 4, there may be provided not only feedback indicating a state where the push button 100a2 is recognized as the icon 3011a2 in the control device 300 but also feedback indicating a state including a cooperation state between the push button 100a2 and another electronic device 100, a communication condition between the control device 300 and the push button 100a2, and a remaining battery level of the push button 100a2. A specific example for representing the state using the color or pattern of light emitted from the indicator 103 and the indicator portion 3013 may be similar to the interlocking feedback during operation on the console screen as described above.

Figure 5:
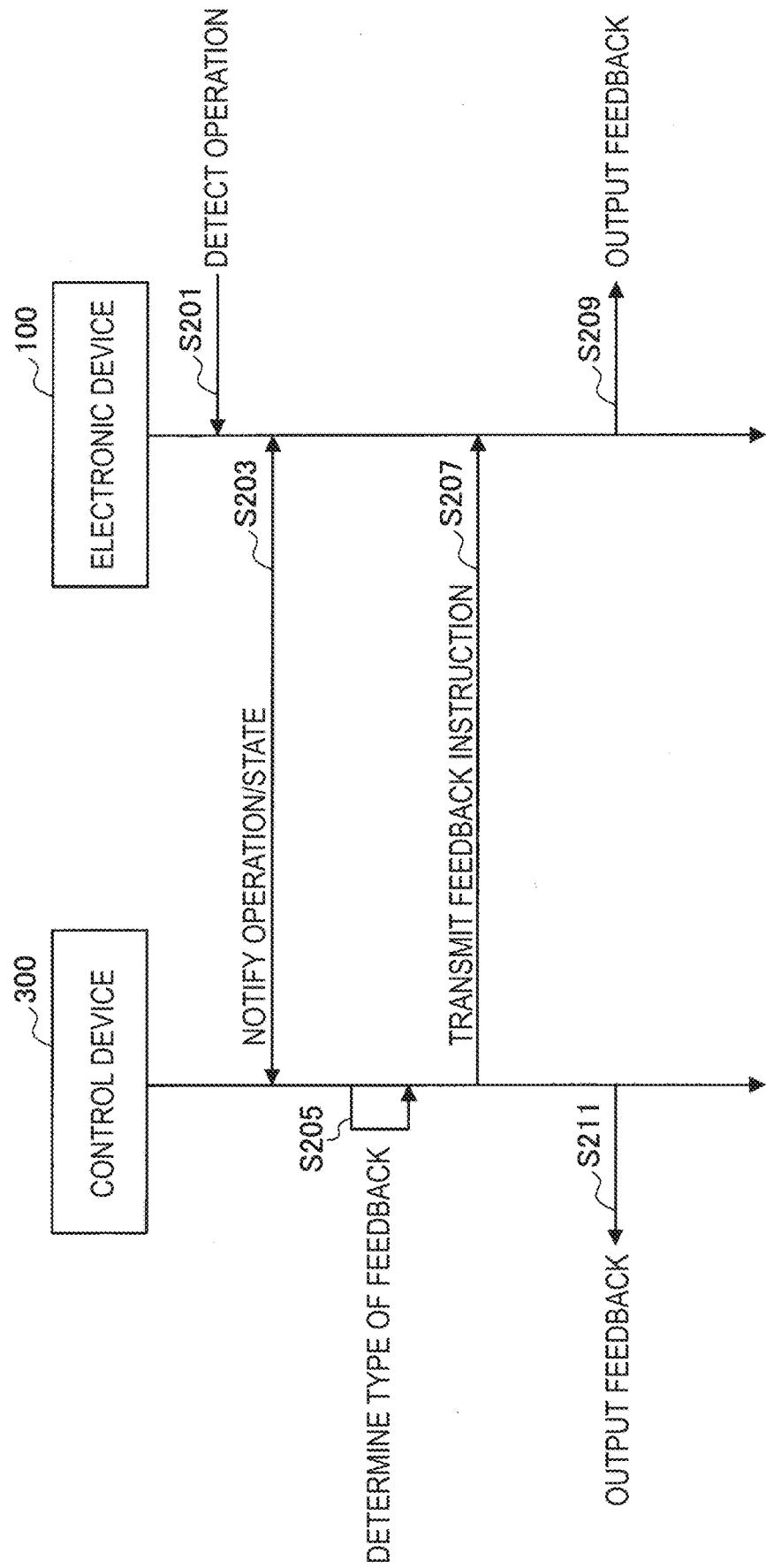
FIG. 5 is a sequence diagram illustrating an example of processing for interlocking feedback during operation on an electronic device in an embodiment of the present disclosure.

FIG. 5 is a sequence diagram illustrating an example of processing for interlocking feedback during operation on the electronic device in an embodiment of the present disclosure. Referring to FIG. 5, the electronic device 100 detects an operation input (depression operation in the above example) on the operation button 105 (S201). In this case, the electronic device 100 notifies the control device 300 of the detected operation (S203). As in the above example, in the case where the state including the communication condition or the remaining battery level of the electronic device 100 is represented through the feedback, the electronic device 100 notifies the control device 300 of such a state in S203.

Next, the control device 300 determines the type of feedback to be provided (S205). For example, the control device 300 determines a color and/or pattern of light to be emitted from the indicator 103 of the electronic device 100 and the indicator portion 3013 displayed on the console screen 3010 so that the colors and/or patterns are in common. In this case, the state of the electronic device 100 notified from the electronic device 100 in S203 and the state of the electronic device 100 recognized independently by the control device 300, more specifically, the state of cooperation, the state of communication, the remaining battery level, or the like may be incorporated in the type of the feedback. Furthermore, similar to the example of the interlocking feedback during operation on the console screen, the type of feedback may be changed each time even in the case where simply the association between the electronic device 100 and the icon 3011 is represented.

In another embodiment of the present disclosure, the electronic device 100 instead of the control device 300 may execute the feedback type determination processing described in S205. In this case, the electronic device 100 notifies the control device 300 of the type of the feedback as well as the operation notification in S203 (the feedback type determination processing is executed prior to the notification in S203). In this case, for example, the state including the communication condition or the remaining battery level of the electronic device 100 also can be incorporated in the type of the feedback.

Next, the control device 300 transmits a feedback instruction to the electronic device 100 (S207). The feedback instruction includes information indicating the type of the feedback determined in S205. The electronic device 100 outputs feedback based on the feedback instruction received from the control device 300 (S209). In the example of FIG. 4, the electronic device 100 outputs the feedback by causing the indicator 103 to emit light. In addition, at the same time, the control device 300 also outputs the feedback (S211). In the example of FIG. 4, the control device 300 outputs the feedback by causing the indicator portion 3013 of the icon 3011 to emit light through the console screen 3010.

(4. Example of Setting Operation on Console Screen)

Figure 6:
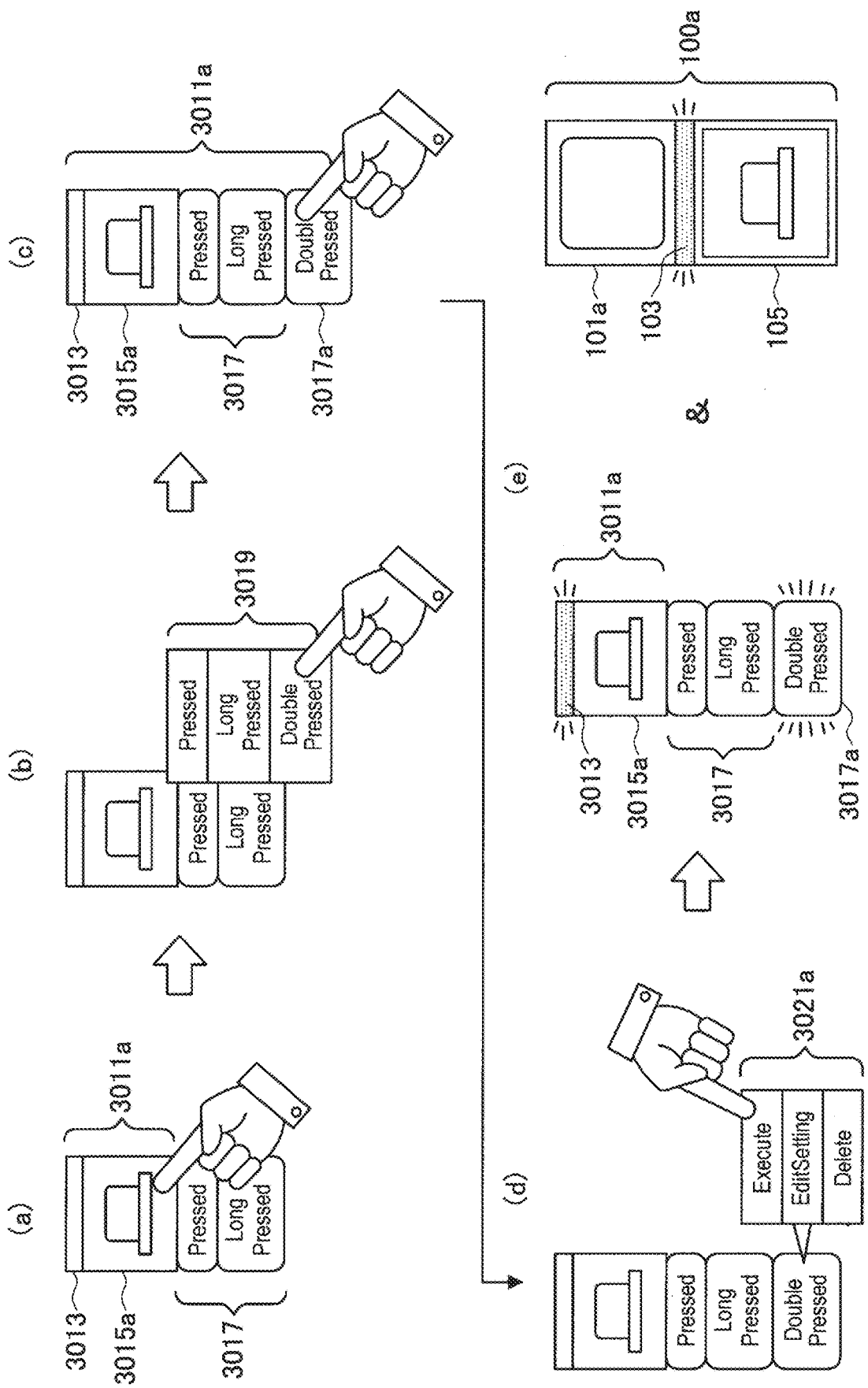
FIG. 6 is a diagram illustrating an example of a setting operation on a console screen in an embodiment of the present disclosure.

FIG. 6 is a diagram illustrating an example of a setting operation on a console screen in an embodiment of the present disclosure. In the example illustrated in FIG. 6, an icon 3001 indicating the electronic device 100 and an operation label 3017 are displayed on the console screen 3010 displayed on the display 301 of the control device 300 in the system 10 described above with reference to FIG. 1. More specifically, in the illustrated example, the operation label 3017 indicating "pressed" and "long pressed" is displayed together with the icon 3011a corresponding to the push button 100a. The operation label 3017 indicates an operation (an operation performed by the electronic device 100 itself and/or an operation performed by the user to the electronic device 100) that is set for the electronic device 100 corresponding to the icon 3011.

In the illustrated example, as shown in (a), the user touches the icon 3011a displayed together with the operation label 3017. This operation means addition of an operation that is set for the electronic device 100 corresponding to the icon 3011a. On the other hand, as shown in (b), the control device 300 causes an operation label addition menu 3019 to be displayed. When the user touches the operation label addition menu 3019 indicating "double pressed", the control device 300 adds an operation label 3017a indicating "double pressed" to the operation label 3017 displayed together with the icon 3011a as shown in (c).

Furthermore, when the user touches the added operation label 3017a, the control device 300 causes an operation label setting menu 3021 to be displayed as shown in (d). In the illustrated example, the operation label setting menu 3021 includes "execute", "edit setting", and "delete". Here, when the user touches the operation label setting menu 3021 of "execution", as shown in (e), the control device 300 highlights (specifically, e.g., blinks or changes the color) the operation label 3017*a*, and causes the indicator portion 3013 of the icon 3011*a* to emit light. Furthermore, similarly to the example of the interlocking feedback during operation on the console screen described above, the control device 300 transmits a feedback instruction to the push button 100*a* corresponding to the icon 3011*a*, and the push button 100*a* that has received this feedback instruction causes the indicator 103 to emit light. In this regard, the color or pattern of light emitted from the indicator portion 3013 of the icon 3011*a* and the color or pattern of light emitted from the indicator 103 of the push button 100*a* are in common.

In the example described above, the indicator portion 3013 of the icon 3011 and the indicator 103 of the electronic device 100 corresponding to the icon 3011 provide a type of feedback in common in accordance with the step of the setting operation using the icon 3011 on the console screen 3010 displayed on the control device 300. This allows the user who performs the setting operation on the console screen 3010 to recognize easily which of the electronic devices 100 is subject to the setting operation.

Moreover, in the above example, the operation that is set using the operation label addition menu 3019 or the operation label setting menu 3021 corresponds to the operation added by the user to the push button 100*a*. Thus, in the step shown in (e) of FIG. 6, the feedback outputted from the push button 100*a* is only the light emission of the indicator 103. On the other hand, for example, in the case where the operation that is set using the operation label addition menu 3019 or the operation label setting menu 3021 is an operation performed independently by the electronic device 100, the electronic device 100 may perform the operation that is set, in addition to causing the indicator 103 to emit light, in the step shown in (e) of FIG. 6. More specifically, for example, in the case where the electronic device 100 is a loudspeaker that outputs sound, outputting sound using the function unit 101 (operation that is set) may be executed, in addition to light emission of the indicator 103.

(5. Example of Performing Operation on Electronic Device)

Figure 7:
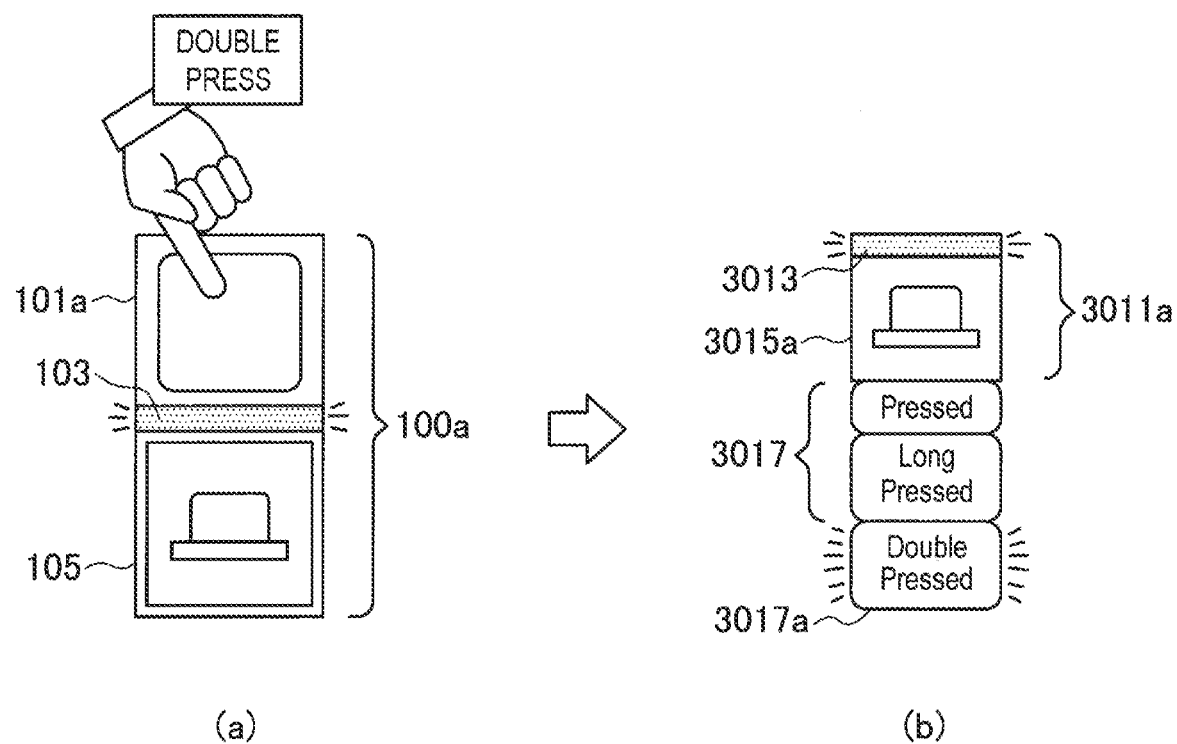
FIG. 7 is a diagram illustrating an example of performing an operation on an electronic device in an embodiment of the present disclosure.

FIG. 7 is a view illustrating an example of performing an operation in an electronic device in an embodiment of the present disclosure. In the example illustrated in FIG. 7, in the system 10 described above with reference to FIG. 1, the user performs an operation on the push button 100*a*, and feedback corresponding to the feedback from the push button 100*a* for the performed operation is provided through an icon 3011*a* and an operation label 3017 included in the console screen 3010 displayed on the display 301 of the control device 300.

In the illustrated example, as shown in (a), the user performs the operation of "double pressed" on the function unit 101*a* (button) of the push button 100*a*. In this case, the push button 100*a* outputs feedback by causing the indicator 103 to emit light in response to the performed operation. Furthermore, the push button 100*a* notifies the control device 300 of the performed operation. Thus, as shown in (b), in the control device 300, on the console screen 3010 displayed on the display 301, the indicator portion 3013 of the icon 3011*a* corresponding to the push button 100*a* and the indicator 103 of the push button 100*a* emit light having a color or pattern in common. Furthermore, the operation label 3017*a* indicating the operation of "double pressed" is highlighted (specifically, e.g., blinked or its color is changed) on the console screen 3010, which is similar to the example described with reference to FIG. 6.

In the example described above, in the case where an operation is performed on the electronic device 100, the electronic device 100 detects the performed operation as a predetermined physical operation (in the example of FIG. 7, the function unit 101*a* (button) of the push button 100*a* functions as an operation detection unit), and transmits information indicating the operation to the control device 300. The control device 300 determines the type of feedback to be provided in common by the indicator portion 3013 of the icon 3011 corresponding to the electronic device 100 and the indicator 103 of the electronic device 100. The control device 300 transmits the determined type of feedback to the electronic device 100, and the electronic device 100 outputs the feedback by the light emission of the indicator 103. The control device 300 also outputs the feedback by causing the indicator portion 3013 displayed on the console screen 3010 to emit light. Furthermore, the control device 300 may additionally provide feedback indicating the detected operation itself, for example, highlights the operation label 3017.

This allows the user who is performing an operation on the electronic device 100 to identify easily what type of the icon 3011 on the console screen 3010 is recognized by the electronic device 100 or what type of operation performed on the electronic device 100 is recognized. The type of feedback (e.g., the color or pattern of light to be emitted) may be changed in accordance with the recognized type of operation.

Moreover, the electronic device 100 on which an operation is performed is the push button 100*a* in the above example. However, in another example, an operation is performed on various types of electronic devices 100 including the acceleration sensor 100*b* and the microphone 100*c* illustrated in FIG. 1, and feedback for the performed operation may be provided by the electronic device 100 itself and the control device 300. More specifically, for example, an operation including shaking, flipping, and tapping can be performed on the acceleration sensor 100*b*. In this case, the functional unit 101*b* (the portion having a built-in sensor) of the acceleration sensor 100*b* serves as the operation detection unit. Furthermore, for example, an operation including an input by uttered voice (contents or sound volume may be identified) and input by handclapping can be performed on the microphone 100*c*. In this case, the functional unit 101*c* (the portion having a built-in sound collecting structure) of the microphone 100*c* serves as an operation detection unit.

(6. Exemplary Functional Configuration of Electronic Device)

Figure 8:
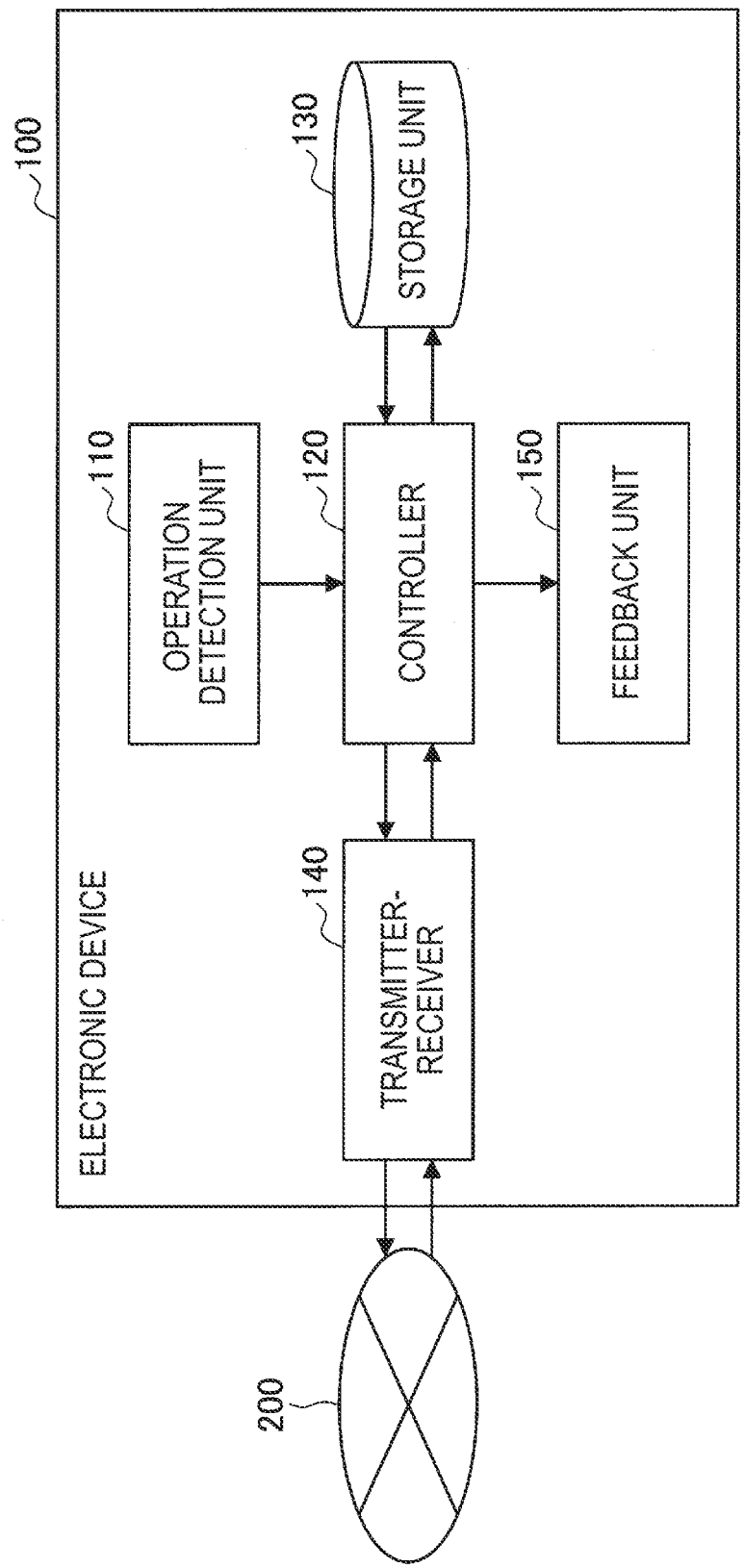
FIG. 8 is a block diagram illustrating an exemplary functional configuration of an electronic device according to an embodiment of the present disclosure.

FIG. 8 is a block diagram illustrating an exemplary functional configuration of the electronic device according to an embodiment of the present disclosure. The electronic device 100 illustrated in FIG. 8 is included, for example, in the system 10 or 10*a* according to the present embodiment described above.

The electronic device 100 is configured to include an operation detection unit 110, a controller 120, a storage unit 130, a transmitter-receiver 140, and a feedback unit 150. Moreover, the hardware configuration of the device that can implement the electronic device 100 will be described later. Furthermore, the configuration (other than the operation detection unit 110 and the feedback unit 150) for the electronic device 100 implements its function and the configuration for the electronic device 100 to identify its own state (e.g., communication condition and remaining battery level) are similar to the configuration of a typical electronic device, and thus their illustrations will be omitted.

The operation detection unit 110 detects a physical operation on the electronic device 100. An example of the physical operation includes an operation on an operating component included in the operation detection unit 110 (e.g., pressing a button and touching a touch screen), an operation on the entire electronic device 100 (e.g., shaking, flipping, and tapping), and/or an operation involving a change in physical states near the electronic device 100 (e.g., making a voice and darkening by covering with hand). More specifically, for example, the operation detection unit 110 may include a switch that is switched by an operation. An example of such a switch is the operation button 105 of the electronic device 100 described above with reference to FIG. 1 or other figures. Furthermore, for example, the operation detection unit 110 may include a sensor whose detection value changes with an operation. An example of the sensor may include an acceleration sensor. An example of such a sensor is the functional unit 101*b* (the portion having a built-in sensor) of the acceleration sensor 100*b* or the functional unit 101*c* (the portion having a built-in sound collecting structure) of the microphone 100*c* described above with reference to FIG. 1 or other figures.

The controller 120 controls the operation of the entire electronic device 100. For example, the controller 120 acquires operation information indicating the detected operation from the operation detection unit 110, and transmits it to the control device 300 via the transmitter-receiver 140 and the network 200. Furthermore, for example, the controller 120 causes the feedback unit 150 to provide feedback in accordance with the feedback information received from the control device 300 via the network 200 and the transmitter-receiver 140. Furthermore, in some examples, the controller 120 may determine the type of feedback provided by the feedback unit 150 for the operation detected by the operation detection unit 110 (i.e., the feedback information may be generated independently). The controller 120 is implemented by allowing, for example, a processor such as a central processing unit (CPU) to be executed in accordance with a program stored in the storage unit 130.

The storage unit 130 stores temporarily or permanently various pieces of information or data to be processed by the controller 120. For example, the storage unit 130 stores temporarily operation information indicating the operation detected by the operation detection unit 110 and feedback information used to cause the feedback unit 150 to provide feedback. Furthermore, for example, the storage unit 130 may store a program executed by a processor that implements the controller 120. In a case where the controller 120 generates the feedback information independently, the storage unit 130 may store the operation detected by the operation detection unit 110 and/or information for associating between the state of the electronic device 100 and the type of feedback provided by the feedback unit 150. The storage unit 130 is implemented by, for example, various storage devices that constitute random-access memory (RAM) or read-only memory (ROM), and/or a removable medium and its driver.

The transmitter-receiver 140 transmits and receives various kinds of information or data via the network 200. For example, the transmitter-receiver 140 transmits the operation information indicating the operation detected by the operation detection unit 110 to the control device 300 that is an external device. As described above, the control device 300 operates an electronic device 100 in cooperation with another electronic device 100. Furthermore, for example, the transmitter-receiver 140 receives feedback information indicating at least the type of feedback representing the state relating to the function of the electronic device 100, which is transmitted by the control device 300 based on the operation information. For example, in the case where only the interlocking feedback during operation on the console screen is implemented among the examples of the present embodiment described above, the transmitter-receiver 140 may only receive the feedback information from the control device 300 (without the function of transmission) as the function of the present embodiment. On the other hands, in the case where only the interlocking feedback during operation on the electronic device is implemented among the examples of the present embodiment described above and the controller 120 generates feedback information independently, the transmitter-receiver 140 may only transmit the feedback information to the control device 300 (without the function of reception).

The feedback unit 150 provides feedback in accordance with the feedback information received by the transmitter-receiver 140 (or generated by the controller 120). An example of the feedback provided by feedback unit 150 includes visual feedback. In this case, the feedback unit 150 includes a light emitter, and the type of feedback may include the color or pattern of light emitted from the light emitter. An example of such a light emitter is the indicator 103 of the electronic device 100 described above with reference to FIG. 1 or other figures. Although the indicator 103 illustrated in FIG. 1 is strip-shaped, the embodiment of the present disclosure is not limited to such an example. For example, the indicator provided in the electronic device may enclose one side of the electronic device, be a circle, or be one or a plurality of points. In addition, as the feedback unit 150 for providing visual feedback, a display may be provided.

Alternatively, an example of the feedback provided by feedback unit 150 may include non-visual feedback. The non-visual feedback may be, in particular, auditory feedback or tactile feedback. In this case, the feedback unit 150 includes, for example, a loudspeaker or a vibrator, and the type of feedback may include a pattern of voice and vibration. Moreover, even in a case where the feedback is nonvisual, feedback provided through the icon displayed on the console screen by the control device 300 may be visual. In this case, the feedback provided through the icon may be a visual representation of the non-visual feedback provided by the feedback unit 150. The type of feedback provided through the icon by the control device 300 and the type of non-visual feedback provided by the feedback unit 150 correspond to each other. More specifically, for example, effects indicating voice or vibration (e.g., a character such as "BEEP" or a broken line) are displayed on the icon displayed on the control device 300 in accordance with the pattern of voice or vibration outputted by the feedback unit 150.

(7. Exemplary Functional Configuration of Control Device)

Figure 9:
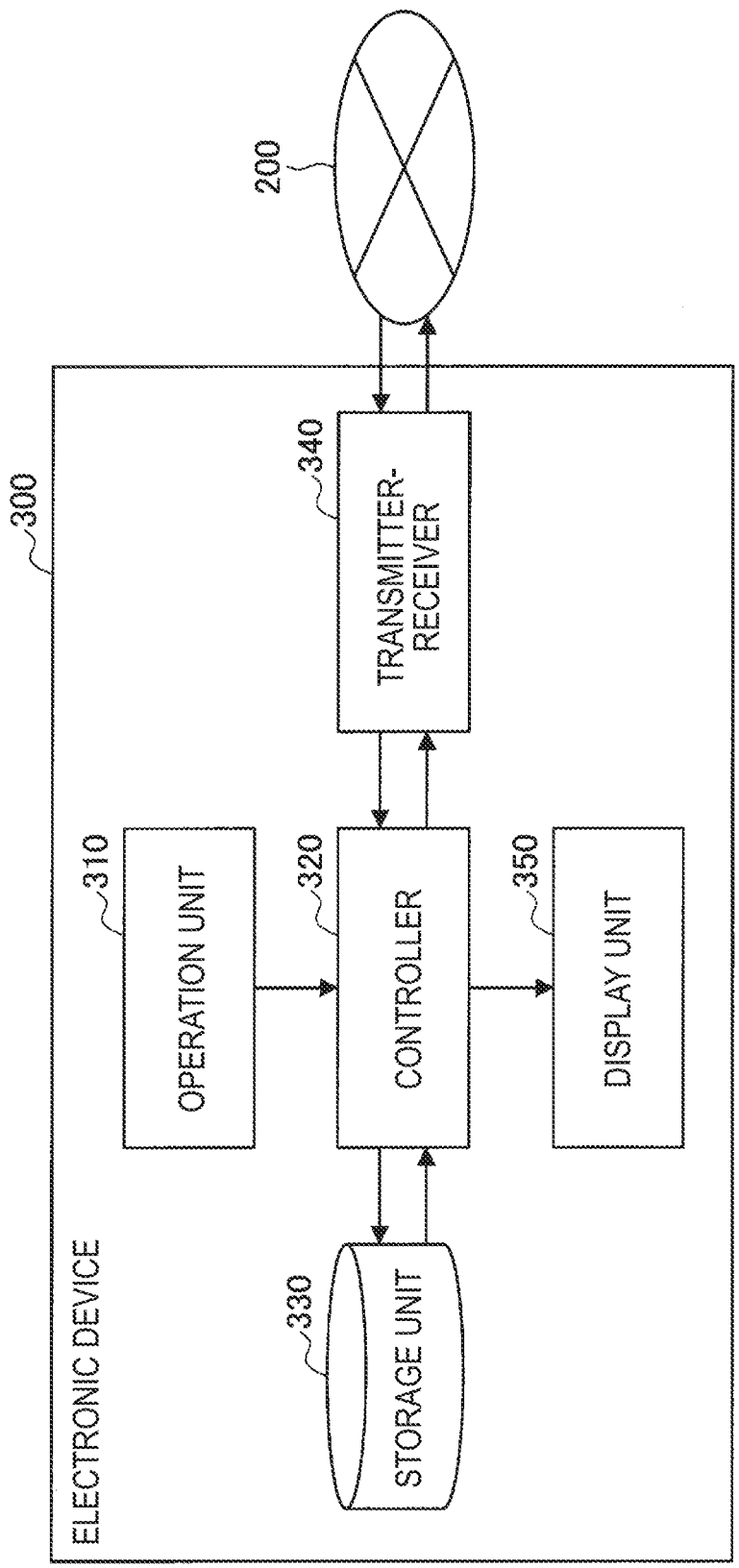
FIG. 9 is a block diagram illustrating an exemplary functional configuration of a control device according to an embodiment of the present disclosure.

FIG. 9 is a block diagram illustrating an exemplary functional configuration of the control device according to an embodiment of the present disclosure. The control device 300 illustrated in FIG. 9 is included, for example, in the system 10 or 10*a* according to the present embodiment described above.

The control device 300 is configured to include an operation unit 310, a controller 320, a storage unit 330, a transmitter-receiver 340, and a display unit 350. Moreover, the hardware configuration of the device that can implement the control device 300 will be described later. Furthermore, as described above, the control device 300 may be, for example, an information processing terminal. However, the configuration for implementing a typical function as the information processing terminal is similar to that of a typical information processing terminal, so its illustration will be omitted.

The operation unit 310 acquires a user's operation on an icon included in the console screen displayed on the display unit 350. The operation unit 310 may include, for example, a pointing device such as a touch screen, a mouse, and a touch pad. Such a pointing device is an example of the touch screen formed on the display 301 in the example described above with reference to FIG. 1 or other figures. Furthermore, the operation unit 310 may include, for example, a camera for acquiring a user's gesture operation.

The controller 320 controls the operation of the entire control device 300. For example, the controller 320 acquires information indicating the operation acquired by the operation unit 310, and regards the information as a user operation on the electronic device 100 corresponding to the icon included in the console screen displayed on the display unit 350. Furthermore, the controller 320 transmits an instruction for causing the electronic device 100, which is the target of the operation, to operate according to the user's operation via the transmitter-receiver 340 and the network 200. Alternatively, the controller 320 adds, changes, and/or deletes the operation that is set for the electronic device 100, more specifically, the cooperative operation with another electronic device 100 in accordance with the user's operation, and incorporates it in the setting information of the electronic device 100 stored in the storage unit 330. In conjunction with or as an alternative to the above-described processing, the controller 320 receives operation information indicating the detected operation from the electronic device 100 via the network 200 and the transmitter-receiver 340, and may determine the type of feedback corresponding to the received operation information. In this case, the controller 320 further generates feedback information including information used to specify the determined type of feedback, and transmits it to the electronic device 100 via the transmitter-receiver 340 and the network 200. The controller 320 is implemented by allowing, for example, a processor such as CPU to be executed in accordance with a program stored in the storage unit 330.

The storage unit 330 stores temporarily or permanently various pieces of information or data to be processed by the controller 320. For example, the storage unit 330 stores temporarily information indicating the operation acquired by the operation unit 310, the operation information received by the transmitter-receiver 340 from the electronic device 100, or the feedback information generated by the controller 320. Furthermore, for example, the storage unit 330 may store a program executed by a processor that implements the controller 320. In a case where the controller 320 generates the feedback information, the storage unit 330 may store the operation detected in the electronic device 100 and/or information for associating between the state of the electronic device 100 and the type of feedback. The storage unit 330 is implemented by, for example, various storage devices that constitute RAM or ROM, and/or a removable medium and its driver.

The transmitter-receiver 340 transmits and receives various kinds of information or data via the network 200. For example, the transmitter-receiver 340 transmits the feedback information generated by the controller 320 to the electronic device 100. In addition, the transmitter-receiver 340 may receive operation information indicating the operation detected in the electronic device 100 from the electronic device 100. In this case, the feedback information to be transmitted to the electronic device 100 may be generated by the controller 320 in response to the received operation information. For example, in the case where only the interlocking feedback during operation on the console screen is implemented among the examples of the present embodiment described above, the transmitter-receiver 340 may only transmit the feedback information to the electronic device 100 (without the function of reception) as the function of the present embodiment. On the other hands, in the case where only the interlocking feedback during operation on the electronic device is implemented among the examples of the present embodiment described above and the controller 120 of the electronic device 100 generates feedback information, the transmitter-receiver 340 may only receive the feedback information from the electronic device 100 (without the function of transmission).

The display unit 350 displays an icon representing the electronic device 100 controlled by the control device 300. The icon may have a shape similar to some or all of the actual electronic devices 100, for example, like the icon 3011 described above with reference to FIG. 1 or other figures. Furthermore, the icon may have a portion corresponding to the feedback unit 150 of the electronic device 100 (e.g., the indicator portion 3013 in the example of FIG. 1). Furthermore, information on a functions or operation of the electronic device 100 may be displayed in conjunction with the icon. Such information on a functions or operation of the electronic device 100 is an example of the operation label 3017, the operation label addition menu 3019, or the operation label setting menu 3021 described above with reference to FIG. 6 or other figures. The display unit 350 is implemented by various display devices, for example, like the display 301 in the example of FIG. 1.

As described above, in the present embodiment, the display unit 350 displays an icon on the console screen, and an operation on the icon is accepted via the operation unit 310. In addition, the display unit 350 provides feedback for an operation on the displayed icon or an operation on the electronic device 100 corresponding to the icon. In this case, the display unit 350 outputs feedback, for example, in accordance with the feedback information generated by the controller 320. More specifically, for example, in the case where visual feedback is provided by light emission of a light emitter (e.g., the indicator 103) in the electronic device 100, the display unit 350 may change its display so that all or part of the icons (e.g., the indicator portion 3013) appears as if it emits light. Furthermore, for example, in a case where non-visual (e.g., auditory or tactile) feedback is provided in the electronic device 100, the display unit 350 displays a change of the visual representation of the feedback.

(8. Hardware Configuration)

Figure 10:
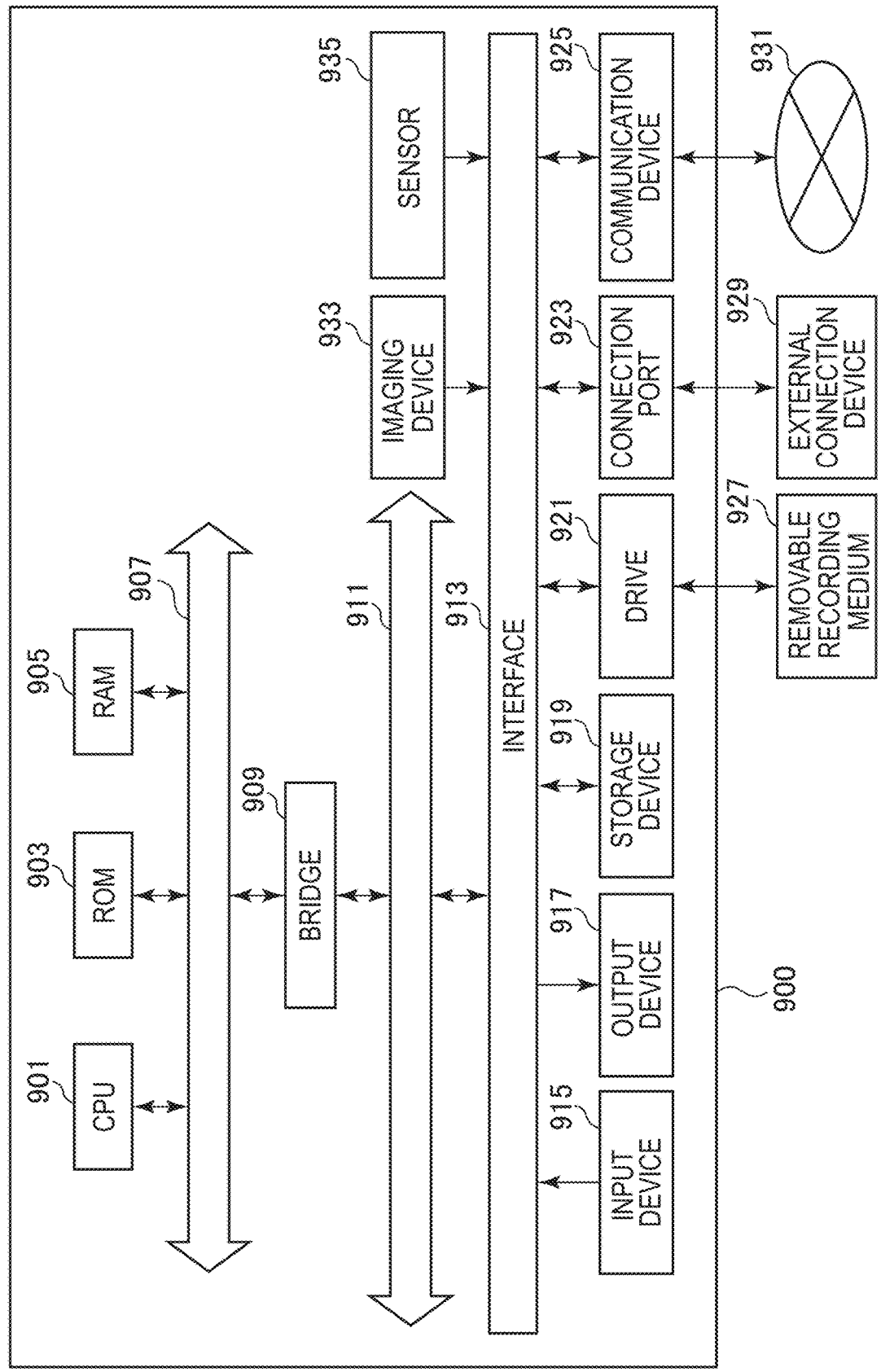
FIG. 10 is a block diagram illustrating an exemplary hardware configuration of an apparatus according to an embodiment of the present disclosure.

Next, referring to FIG. 10, a hardware configuration of an apparatus according to an embodiment of the present disclosure is described. FIG. 10 is a block diagram illustrating a hardware configuration example of an apparatus according to an embodiment of the present disclosure. An illustrated apparatus 900 may be implemented as, for example, the electronic device 100 and/or the control device 300 according to the embodiments of the present disclosure.

The apparatus 900 is configured to include a central processing unit (CPU) 901, read-only memory (ROM) 903, and random-access memory (RAM) 905. In addition, the apparatus 900 may be configured to include a host bus 907, a bridge 909, an external bus 911, an interface 913, an input device 915, an output device 917, a storage device 919, a drive 921, a connection port 923, and a communication device 925. Furthermore, the apparatus 900 may be configured to include an imaging device 933 and a sensor 935, as necessary. The apparatus 900 may include a processing circuit such as a digital signal processor (DSP), an application-specific integrated circuit (ASIC), or a field-programmable gate array (FPGA), in conjunction with or in place of the CPU 901.

The CPU 901 serves as an arithmetic processing apparatus and a control apparatus, and controls the overall operation or a part of the operation of the apparatus 900 according to various programs recorded in the ROM 903, the RAM 905, the storage apparatus 919, or a removable recording medium 927. The ROM 903 stores programs, operation parameters, and the like used by the CPU 901. The RAM 905 temporarily stores programs used in executing the CPU 901 and various parameters that change as appropriate in executing such programs. The CPU 901, the ROM 903, and the RAM 905 are connected with each other via the host bus 907 configured from an internal bus such as a CPU bus or the like. The host bus 907 is connected to the external bus 911 such as a Peripheral Component Interconnect/Interface (PCI) bus via the bridge 909.

The input device 915 is a device operated by a user, such as a mouse, a keyboard, a touch screen, a button, a switch, and a lever. The input device 915 may be a remote control device that uses, for example, an infrared ray or other radio waves. Alternatively, the input device 915 may be an external connection device 929, such as a mobile phone, which corresponds to an operation of the apparatus 900. The input device 915 includes an input control circuit that generates input signals based on information inputted by a user and outputs it to the CPU 901. The user inputs various types of data to the apparatus 900 and instructs the apparatus 900 to perform a processing operation by operating the input device 915.

The output device 917 includes a device that can report acquired information to a user using visual, auditory, or tactile sense. The output device 917 may be, for example, a display device such as a liquid crystal display (LCD) or an organic electro-luminescence (EL) display, an audio output device such as a loudspeaker and a headphone, or a vibrator. The output device 917 outputs a result obtained through a process performed by the apparatus 900, in the form of video such as text and an image, audio such as voice and sound, or vibration.

The storage device 919 is a device for data storage configured as an example of a storage unit of the apparatus 900. An example of the storage device 919 includes a magnetic storage device such as a hard disk drive (HDD), a semiconductor storage device, an optical storage device, or a magneto-optical storage device. The storage device 919 stores therein the programs and various data executed by the CPU 901, various data acquired from an outside, and the like.

The drive 921 is a reader/writer for the removable recording medium 927 such as a magnetic disk, an optical disc, a magneto-optical disk, and a semiconductor memory, and built in or externally attached to the apparatus 900. The drive 921 reads out information recorded on the mounted removable recording medium 927, and outputs the information to the RAM 905. Furthermore, the drive 921 writes the record into the mounted removable recording medium 927.

The connection port 923 is a port used to connect the devices to the apparatus 900. The connection port 923 may be a Universal Serial Bus (USB) port, an IEEE 1394 port, and a Small Computer System Interface (SCSI) port. Furthermore, the connection port 923 may be an RS-232C port, an optical audio terminal, a High-Definition Multimedia Interface (HDMI) (registered trademark) port, and so on.

The connection of the external connection device 929 to the connection port 923 makes it possible to exchange various data between the apparatus 900 and the external connection device 929.

The communication device 925 is a communication interface including, for example, a communication device for connection to a communication network 931. The communication device 925 may be, for example, a communication card for a local area network (LAN), Bluetooth (registered trademark), Wi-Fi, or a wireless USB (WUSB). The communication device 925 may also be, for example, a router for optical communication, a router for asymmetric digital subscriber line (ADSL), or a modem for various types of communication. For example, the communication device 925 transmits and receives signals in the Internet or to and from another communication device by using a predetermined protocol such as TCP/IP. The communication network 931 connected to the communication device 925 is a network established through wired or wireless connection. The communication network 931 may include, for example, the Internet, a home LAN, infrared communication, radio wave communication, or satellite communication.

The imaging device 933 is a device that captures an image of a real space by using an image sensor such as a complementary metal oxide semiconductor (CMOS) and charge-coupled device (CCD) and various members such as a lens for controlling formation of an image of a subject onto the image sensor, and generates the captured image. The imaging device 933 may capture still images or moving images.

The sensor 935 is various sensors such as an acceleration sensor, an angular velocity sensor, a geomagnetic sensor, an illuminance sensor, a temperature sensor, a barometric sensor, and a sound sensor (microphone). The sensor 935 acquires information regarding a state of the apparatus 900 such as a posture of a housing of the apparatus 900, and information regarding an environment surrounding the apparatus 900 such as luminous intensity and noise around the apparatus 900. Furthermore, the sensor 935 may include a global positioning system (GPS) receiver that receives GPS signals to measure latitude, longitude, and altitude of the apparatus.

The exemplary hardware configuration of the apparatus 900 has been described. Each of the structural elements described above may be configured by using a general purpose component or may be configured by hardware specialized for the function of each of the structural elements. Such a configuration may be changed appropriately in accordance with the technical level at the time of implementation.

(9. Supplement)

The embodiments of the present disclosure may include, for example, the information processing device (the electronic device or the control device) as described above, a system, a method of information processing executed by the information processing device or the system, a program for causing the information processing apparatus to execute its function, and a non-transitory, tangible medium having the program stored therein.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Furthermore, the effects described in this specification are merely illustrative or exemplified effects, and are not limitative. That is, in conjunction with or in the place of the above effects, the technology according to the present disclosure may achieve other effects that are clear to those skilled in the art based on the description of this specification.

Additionally, the present technology may also be configured as below.

(1)

An electronic device that implements a predetermined function, the electronic device including:

an operation detection unit configured to detect a physical operation on the electronic device;

a transmitter configured to transmit operation information indicating the operation to an external device;

a receiver configured to receive feedback information indicating at least a type of feedback representing a state relating to the function, the feedback information being transmitted by the external device in response to the operation information; and a feedback unit configured to provide the feedback in accordance with the feedback information.

(2)

The electronic device according to (1), wherein the state includes a recognition state of the electronic device in the external device.

(3)

The electronic device according to (2), wherein the external device includes a control device configured to cause the electronic device and another device to operate in cooperation with each other, and the electronic device and the other device are both recognized by the control device.

(4)

The electronic device according to (3), wherein the state includes a state of cooperation between the electronic device and the other device.

(5)

The electronic device according to any one of (1) to (4), wherein the operation detection unit includes a switch configured to be switched by the operation.

(6)

The electronic device according to any one of (1) to (5), wherein the operation detection unit includes a sensor whose detection value is changed by the operation.

(7)

The electronic device according to (6), wherein the operation detection unit includes an acceleration sensor.

(8)

The electronic device according to (7), wherein the operation includes an operation of shaking, flipping, or tapping the electronic device.

(9)

The electronic device according to any one of (1) to (8), wherein the state includes a recognition state of the operation in the external device.

(10)

The electronic device according to any one of (1) to (9), wherein the state includes a communication state of the electronic device.

(11)

The electronic device according to any one of (1) to (10), wherein the state includes a remaining battery level of the electronic device.

(12)

The electronic device according to any one of (1) to (11), wherein the feedback includes visual feedback.

(13)

The electronic device according to (12), wherein the visual feedback has a type corresponding to a type of visual feedback provided in the external device.

(14)

The electronic device according to (12) or (13), wherein the feedback unit includes a light emitter, and the type of the feedback includes a light emission color or a light emission pattern of the light emitter.

(15)

The electronic device according to any one of (1) to (14), wherein the feedback includes non-visual feedback.

(16)

The electronic device according to (15), wherein the non-visual feedback has a type corresponding to a type of feedback obtained as a visual representation of the non-visual feedback provided in the external device.

(17)

A feedback providing method including, by an electronic device that implements a predetermined function:

detecting a physical operation on the electronic device;

transmitting operation information indicating the operation to an external device;

receiving feedback information indicating at least a type of feedback representing a state regarding the function, the feedback information being transmitted by the external device in response to the operation information; and providing the feedback in accordance with the feedback information.

REFERENCE SIGNS LIST 10 system
100 electronic device
101 functional unit
103 indicator
105 operation button
110 operation detection unit
120 controller
130 storage unit
140 transmitter-receiver
150 feedback unit
200 network
300 control device
301 display
310 operation unit
320 controller
330 storage unit
340 transmitter-receiver
350 display unit

The invention claimed is:

1. An electronic device that is operable both independently and in cooperation with other devices, the electronic device comprising:

processing circuitry configured to
receive an input, the input being detected as voice;
control a transmitter to transmit input information indicating the input to an external device, the external device being located physically apart from the electronic device;
receive, via a receiver, feedback information indicating at least a type of feedback representing a state of the external device, the feedback information being transmitted by the external device in response to the input information; and control outputting the feedback in accordance with the received feedback information, wherein the state includes a remaining battery level of the external device, the processing circuitry is configured to control outputting the remaining battery level of the external device by first sound, the state further includes a communication state of the external device with the electronic device, and the processing circuitry is configured to control outputting the communication state by second sound.

2. The electronic device according to claim 1, wherein the state includes a state of cooperation between the electronic device and the external device.

3. The electronic device according to claim 1, wherein the electronic device is a loudspeaker or a LED lamp.

4. The electronic device according to claim 1, wherein the feedback includes non-visual feedback.

5. The electronic device according to claim 4, wherein the non-visual feedback includes voice-type feedback.

6. The electronic device according to claim 1, wherein the feedback includes visual feedback.

7. The electronic device according to claim 6, wherein the visual feedback has a type corresponding to a type of visual feedback provided in the external device.

8. The electronic device according to claim 7, wherein the processing circuitry is configured to control outputting the feedback via a light emitter, and the type of the feedback includes a light emission color or a light emission pattern of the light emitter.

9. The electronic device according to claim 1, wherein the processing circuitry is configured to receive the voice via a microphone.

10. The electronic device according to claim 1, wherein the state includes a recognition state of the electronic device in the external device.

11. The electronic device according to claim 1, wherein the state includes a recognition state of the voice in the external device.

12. A method by an electronic device that is operable both independently and in cooperation with other devices, the method comprising:

receiving an input, the input being detected as voice;

transmitting input information indicating the input to an external device, the external device being located physically apart from the electronic device;

receiving feedback information indicating at least a type of feedback representing a state of the external device, the feedback information being transmitted by the external device in response to the input information; and outputting the feedback in accordance with the received feedback information, wherein the state includes a remaining battery level of the external device, the method further comprises outputting the remaining battery level of the external device by first sound, the state further includes a communication state of the external device with the electronic device, and the method further comprises outputting the communication state by second sound.

13. A non-transitory computer readable medium including executable instructions, which when executed by a computer cause the computer to execute a method by an electronic device that is operable both independently and in cooperation with other devices, the method comprising:

receiving an input, the input being detected as voice;

transmitting input information indicating the input to an external device, the external device being located physically apart from the electronic device;

receiving feedback information indicating at least a type of feedback representing a state of the external device, the feedback information being transmitted by the external device in response to the input information; and outputting the feedback in accordance with the received feedback information, wherein the state includes a remaining battery level of the external device, the method further comprises outputting the remaining battery level of the external device by first sound, the state further includes a communication state of the external device with the electronic device, and the method further comprises outputting the communication state by second sound.

* * * * *